US012205433B1

(12) United States Patent
Anderson

(10) Patent No.: US 12,205,433 B1
(45) Date of Patent: *Jan. 21, 2025

(54) PILL STORAGE AND DISPENSING SYSTEMS AND METHODS

(71) Applicant: PillNurse, Inc., Glendale, AZ (US)

(72) Inventor: Troy G. Anderson, Scottsdale, AZ (US)

(73) Assignee: PillNurse, Inc., Glendale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,906

(22) Filed: May 3, 2023

Related U.S. Application Data

(63) Continuation of application No. 17/832,610, filed on Jun. 4, 2022, now Pat. No. 11,645,883, which is a continuation of application No. 17/192,656, filed on Mar. 4, 2021, now Pat. No. 11,354,968.

(60) Provisional application No. 62/985,738, filed on Mar. 5, 2020.

(51) Int. Cl.
*G07F 17/00* (2006.01)
*A61J 1/03* (2023.01)
*A61J 7/00* (2006.01)

(52) U.S. Cl.
CPC ............ *G07F 17/0092* (2013.01); *A61J 1/03* (2013.01); *A61J 7/0076* (2013.01); *A61J 2205/60* (2013.01)

(58) Field of Classification Search
CPC ....... G07F 17/0092; A61J 1/03; A61J 7/0076; A61J 2205/60
See application file for complete search history.

(56) References Cited

U.S. PATENT DOCUMENTS

| | | | | |
|---|---|---|---|---|
| 3,045,864 A | | 7/1962 | Hurst et al. | |
| 3,091,402 A | | 5/1963 | Palmer | |
| 3,368,713 A | | 2/1968 | Hurst et al. | |
| 3,568,882 A | | 3/1971 | Aidlin | |
| RE28,557 E | | 9/1975 | Williams et al. | |
| 4,543,313 A | | 9/1985 | Mahabadi et al. | |
| 4,915,205 A | | 4/1990 | Reid et al. | |
| 5,803,309 A | | 9/1998 | Yuyama et al. | |
| 5,810,198 A | | 9/1998 | Townsend et al. | |
| 5,812,410 A | * | 9/1998 | Lion | G07F 11/62 221/9 |
| 5,838,575 A | * | 11/1998 | Lion | G07F 11/62 221/9 |

(Continued)

*Primary Examiner* — Michael Collins
(74) *Attorney, Agent, or Firm* — QUARLES & BRADY LLP

(57) ABSTRACT

A pill-dispensing system includes a base including a first processor and a storage, a container for pills carried by the base, and a dispenser mechanism. A data store includes an authorization code and instructions. A second processor is coupled to the data store, is in communication with the first processor, and is programmed to receive from the first processor a code associated with the container, compare the code to the authorization code, and retrieve and serve the instructions to the first processor upon the code matching the authorization code. The first processor is programmed, upon receiving the instructions from the second processor, to download to the storage the instructions that when executed by the first processor cause the first processor to effectuate a dispensing of pills from the container by the dispenser mechanism.

15 Claims, 16 Drawing Sheets

(56) References Cited

U.S. PATENT DOCUMENTS

| | | | | |
|---|---|---|---|---|
| 6,032,155 | A | 2/2000 | de la Huerga | |
| 6,330,491 | B1 * | 12/2001 | Lion | G07F 17/0014 700/232 |
| 6,438,451 | B1 * | 8/2002 | Lion | G16H 40/67 700/241 |
| 6,471,093 | B1 | 10/2002 | Kodama | |
| 6,622,887 | B1 | 9/2003 | Roediger | |
| 7,048,141 | B2 | 5/2006 | Abdulhay et al. | |
| 7,158,011 | B2 | 1/2007 | Brue | |
| 7,219,703 | B2 | 5/2007 | Geltser et al. | |
| 7,369,919 | B2 | 5/2008 | Vonk et al. | |
| 7,828,147 | B2 | 11/2010 | Caracciolo | |
| 7,944,342 | B2 | 5/2011 | Sekura | |
| 8,019,471 | B2 | 9/2011 | Bogash et al. | |
| 8,193,918 | B1 | 6/2012 | Shavelsky et al. | |
| 8,600,548 | B2 | 12/2013 | Bossi | |
| 9,387,154 | B2 | 7/2016 | Aggarwal et al. | |
| 9,827,680 | B2 | 11/2017 | Davey | |
| 10,073,954 | B2 | 9/2018 | Chen et al. | |
| 10,940,093 | B2 | 3/2021 | Williamson et al. | |
| 11,354,968 | B2 * | 6/2022 | Anderson | G07F 9/026 |
| 11,645,883 | B1 * | 5/2023 | Anderson | A61J 7/0076 221/1 |
| 2002/0070227 | A1 | 6/2002 | Ferruccio | |
| 2003/0183642 | A1 | 10/2003 | Kempker, Sr. | |
| 2004/0167408 | A1 | 8/2004 | Ashida et al. | |
| 2007/0235464 | A1 | 10/2007 | Vasquali | |
| 2011/0022224 | A1 | 1/2011 | Park | |
| 2012/0118165 | A1 | 5/2012 | Van Os et al. | |
| 2013/0304255 | A1 * | 11/2013 | Ratnakar | G07F 17/0092 700/242 |
| 2014/0326636 | A1 | 11/2014 | Baschnagel | |
| 2014/0350720 | A1 | 11/2014 | Lehmann et al. | |
| 2014/0358278 | A1 | 12/2014 | Zhang et al. | |
| 2015/0021352 | A1 | 1/2015 | Kaga | |
| 2015/0266654 | A1 | 9/2015 | Baarman et al. | |
| 2016/0022541 | A1 * | 1/2016 | Dalal | A61J 7/0084 221/9 |
| 2017/0213010 | A1 | 7/2017 | Sucilla | |
| 2018/0016037 | A1 | 1/2018 | Kim | |
| 2018/0028407 | A1 | 2/2018 | Omura | |
| 2019/0091106 | A1 | 3/2019 | Kim | |
| 2019/0318607 | A1 | 10/2019 | Johnson | |

* cited by examiner

PILL STORAGE AND DISPENSING SYSTEMS AND METHODS

CROSS-REFERENCE TO RELATED APPLICATION

This application claims the benefit of U.S. Provisional Patent Application No. 62/985,738, filed Mar. 5, 2020, the entire contents of which are incorporated herein by reference.

FIELD OF THE INVENTION

The present invention relates generally to systems and methods for storing and dispensing pills for treating a disease or illness, relieving pain or other condition, providing nourishment, or for providing another chosen biologically effective result.

BACKGROUND OF THE INVENTION

A prescription drug is a pharmaceutical preparation that legally requires a medical prescription to be dispensed to a patient. A prescription is a direction, usually written, by a physician to the pharmacist for the preparation and use of a medicine or remedy, which is required for a patient to purchase a prescription drug from a pharmacist. The use of prescription drugs has steadily increased since the 1960s. In the U.S., for example, nearly 90% of older adults 62-85 years of age use at least one prescription drug, while nearly 40% take at least five prescription medicines concurrently.

In the field of prescription drugs, medical adherence or patient compliance mean the adherence of a patient to a prescribed medicine routine, namely, the taking of a prescription drug at the right dose, at the right time, and in the right way and frequency. Non-adherence or patient non-compliance, the failure of a patient to take their medicine as prescribed, can cause chronic disease treatment failure and, in some instances, death. In the United States, the Center for Disease Control and Prevention (CDC) estimates that 20-30 percent of new prescriptions are never filled at a pharmacy, that medicine is not taken as prescribed approximately 50 percent of the time, that after six months the majority of patients prescribed medicines for chronic diseases take less medicine than prescribed or stop taking the medicine altogether, and that only about 50 percent of patients who take medicines for high blood pressure continue taking their medicine during long-term treatment.

Given these and other deficiencies inherent in the art, there is a continuing and ongoing need for a cost-effective and practicable way for easily and efficiently supplying a user/patient with pills of a chosen substance, for enabling a user/patient to take the pills at the right dose, at the right time, and in the right way and frequency, for enabling a physician, health care professional, or other authorized party to track and monitor user/patient compliance in taking the pills, and which is simple in structure, low in cost, and that exploits an Internet.

SUMMARY OF THE INVENTION

According to the invention, a pill-dispensing system includes a base including a first processor and a storage, a container for pills carried by the base, and a dispenser mechanism. A data store includes an authorization code and instructions. A second processor is coupled to the data store, is in communication with the first processor, and is programmed to receive from the first processor a code associated with the container, compare the code to the authorization code, and serve the instructions to the first processor upon the code matching the authorization code thereby verifying the container and its pills. The first processor is programmed, upon receiving the instructions from the second processor, to download to the storage the instructions that when executed by the first processor cause the first processor to effectuate a dispensing of pills from the container by the dispenser mechanism. The second processor is in communication with the first processor through an Internet. In an exemplary embodiment, the code is carried by the container, a reader is carried by the base and is operatively coupled to the first processor, and the first processor is programmed to read the code on the container by the reader and issue the code to the second processor. In a particular embodiment, the reader includes an RFID reader, the code is housed as digital data on an RFID tag carried by the container, and the RFID tag transmits the digital data to the RFID reader upon the RFID tag being triggered by an electromagnetic interrogation pulse from the RFID reader. The storage is a non-transitory computer readable storage medium. The dispensing is a regimented dispensing in an illustrative embodiment.

According to the invention, a pill-dispensing system includes a container for pills, and a base configured to receive the container. The base includes a first processor and a storage. Additionally included is a data store including an authorization code and instructions, and a second processor. The second processor is coupled to the data store, is in communication with the first processor, and is programmed to receive from the first processor a code associated with the container upon the base receiving the container, compare the code to the authorization code, and serve the instructions to the first processor upon the code matching the authorization code thereby verifying the container and its pills. The first processor is programmed, upon receiving the instructions from the second processor, to download to the storage the instructions that when executed by the first processor cause the first processor to effectuate a dispensing of pills from the container by a dispenser mechanism operatively coupled to the container. The second processor is in communication with the first processor through an Internet. In an illustrative embodiment, the code is carried by the container, a reader carried by the base is operatively coupled to the first processor, and the first processor is programmed to read the code on the container by the reader and issue the code to the second processor upon the base receiving the container. In a particular embodiment, the reader is an RFID reader, the code is housed as digital data on an RFID tag carried by the container, and the RFID tag transmits the digital data to the RFID reader upon the RFID tag being triggered by an electromagnetic interrogation pulse from the RFID reader. The storage is a non-transitory computer readable storage medium. The dispensing is a regimented dispensing in an illustrative embodiment.

According to the invention, a method includes establishing a base including a first processor and a storage, a container for pills carried by the base, and a dispenser mechanism, establishing a data store including an authorization code and instructions, and a second processor coupled to the data store and in communication with the first processor, the second processor receiving from the first processor a code associated with the container, comparing the code to the authorization code, and serving the instructions to the first processor upon the code matching the authorization code thereby verifying the container and its pills, and the first processor, upon receiving the instructions from the second processor, downloading to the storage the instructions that when executed by the first processor cause the first processor to effectuate a dispensing of pills from the container by the dispenser mechanism. The second processor is in communication with the first processor through an Internet. The code is carried by the container, a reader is carried by the base and is operatively coupled to the first processor, and the method additionally includes the first processor reading the code on the container by the reader and issuing the code to the second processor before the step of the second processor receiving from the first processor the code. The reader is an RFID reader, the code is housed as digital data on an RFID tag carried by the container, and the step of the first processor reading the code additionally includes the RFID reader issuing an electromagnetic interrogation pulse to the RFID tag and the RFID tag transmitting the digital data to the RFID reader in response. The storage is a non-transitory computer readable storage medium. The dispensing is a regimented dispensing in an illustrative embodiment.

According to the invention, a method includes establishing a container for pills, and base including a first processor and a storage, establishing a data store including an authorization code and instructions, and a second processor coupled to the data store and in communication with the first processor, the second processor, upon assembling the container and the base, receiving from the first processor a code associated with the container, comparing the code to the authorization code, and serving the instructions to the first processor upon the code matching the authorization code thereby verifying the container and its pills, and the first processor, upon receiving the instructions from the second processor, downloading to the storage the instructions that when executed by the first processor cause the first processor to effectuate a dispensing of pills from the container by the dispenser mechanism. The second processor is in communication with the first processor through an Internet. The code is carried by the container, a reader is carried by the base and is operatively coupled to the first processor, and the method additionally includes the first processor reading the code on the container by the reader and issuing the code to the second processor upon the step of assembling the container and the base before the step of the second processor receiving from the first processor the code. The reader is an RFID reader, the code is housed as digital data on an RFID tag carried by the container, and the step of the first processor reading the code additionally includes the RFID reader issuing an electromagnetic interrogation pulse to the RFID tag and the RFID tag transmitting the digital data to the RFID reader in response. The storage is a non-transitory computer readable storage medium. The dispensing is a regimented dispensing in an illustrative embodiment.

BRIEF DESCRIPTION OF THE DRAWINGS

Specific objects and advantages of the invention will become readily apparent to those skilled in the art from the following detailed description of illustrative embodiments thereof, taken in conjunction with the drawings in which.

DETAILED DESCRIPTION

Improved pill storage and dispensing systems and methods are disclosed.

Figure 1:
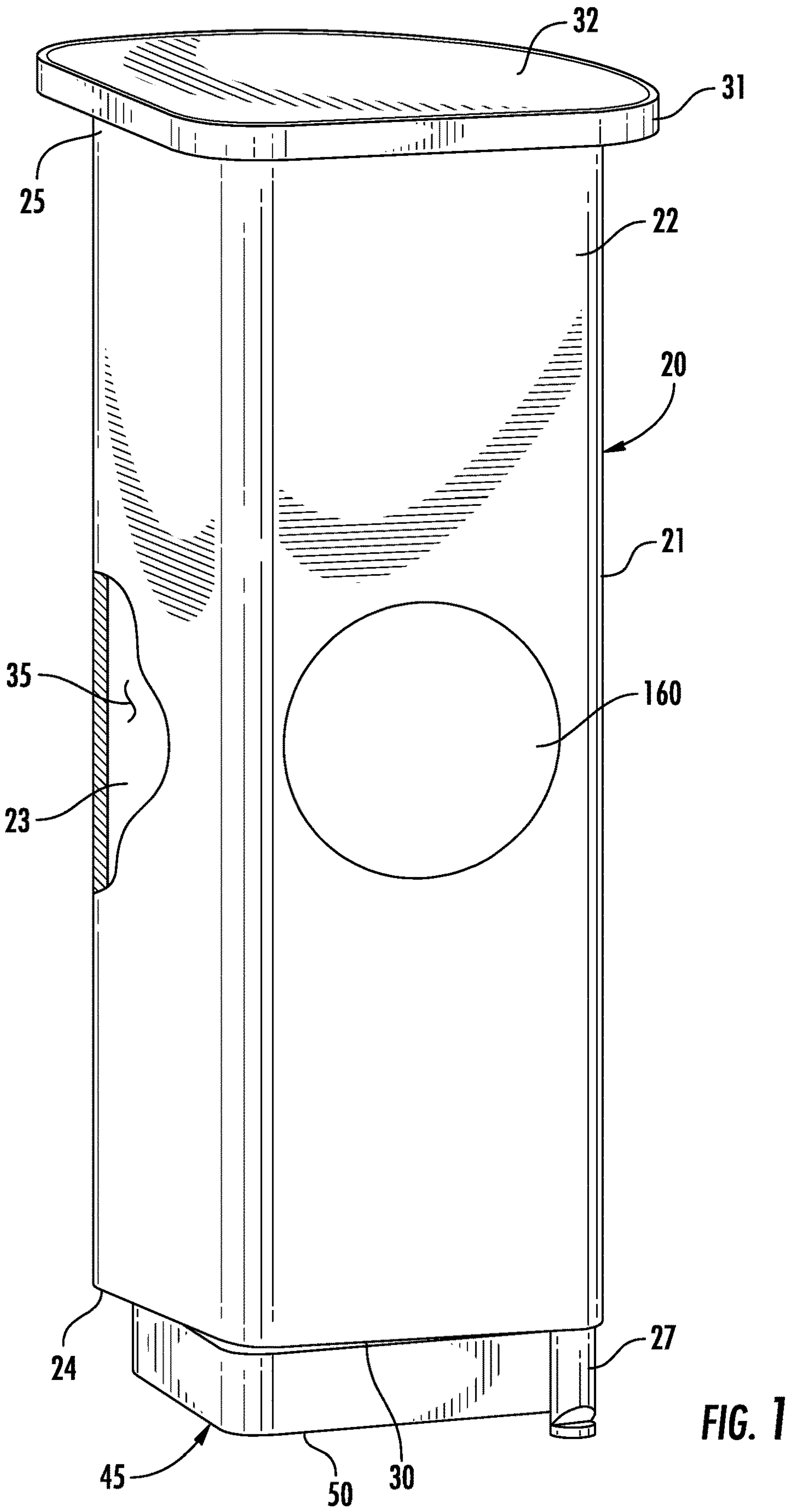
FIG. 1-5 are perspective views of a container for pills constructed and arranged in accordance with the principles of the invention.
Figure 2:
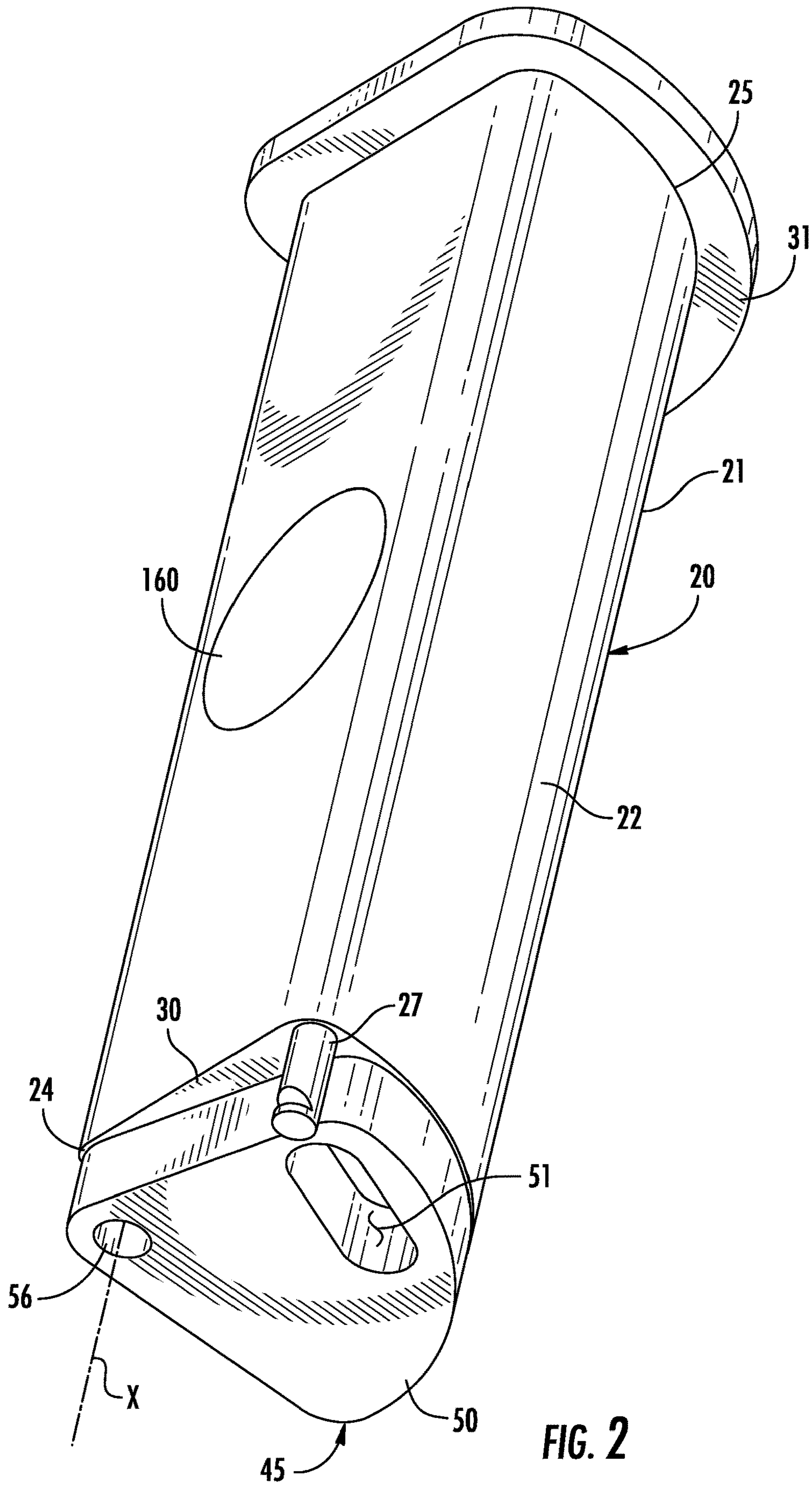
Figure 3:
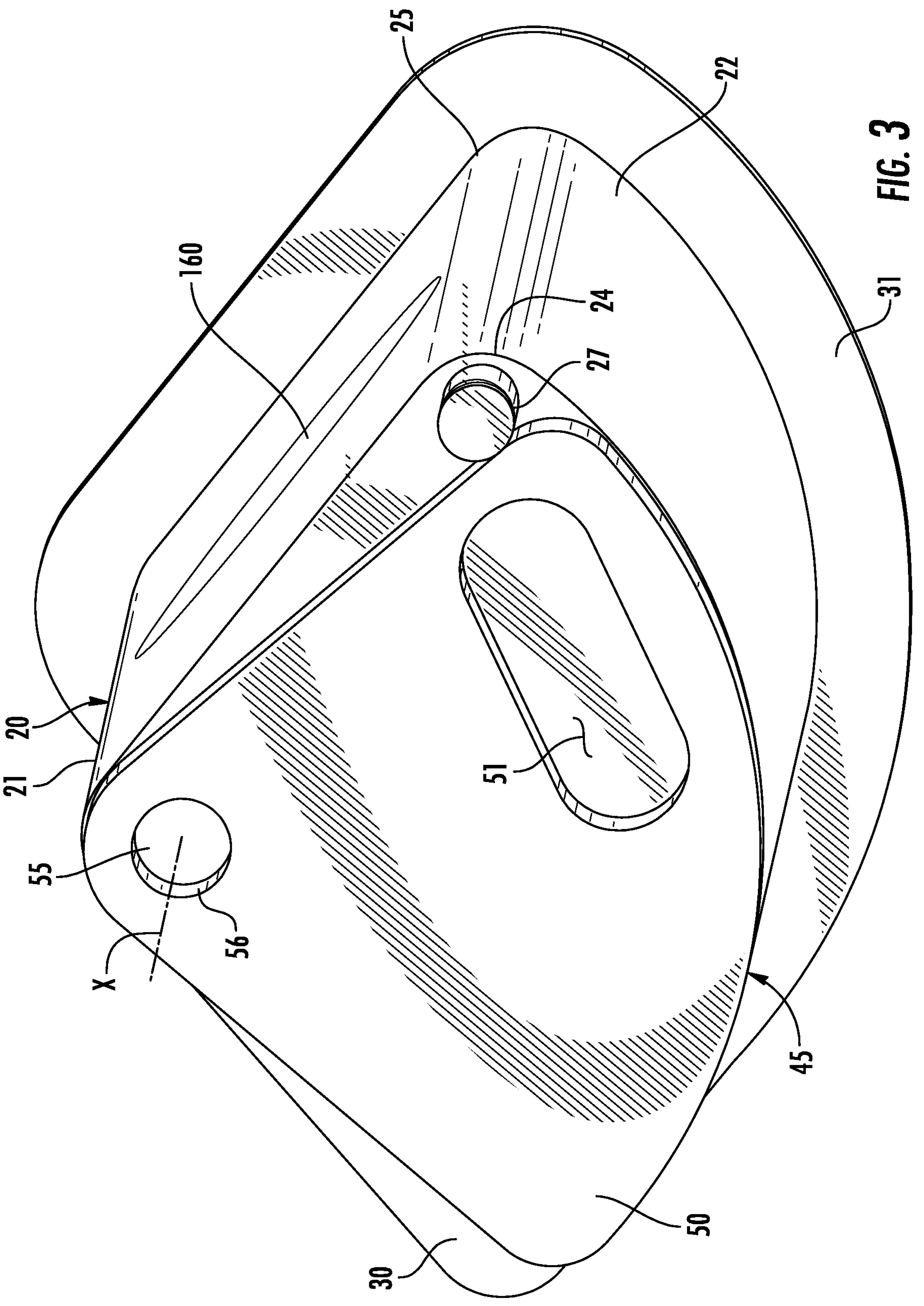
Figure 4:
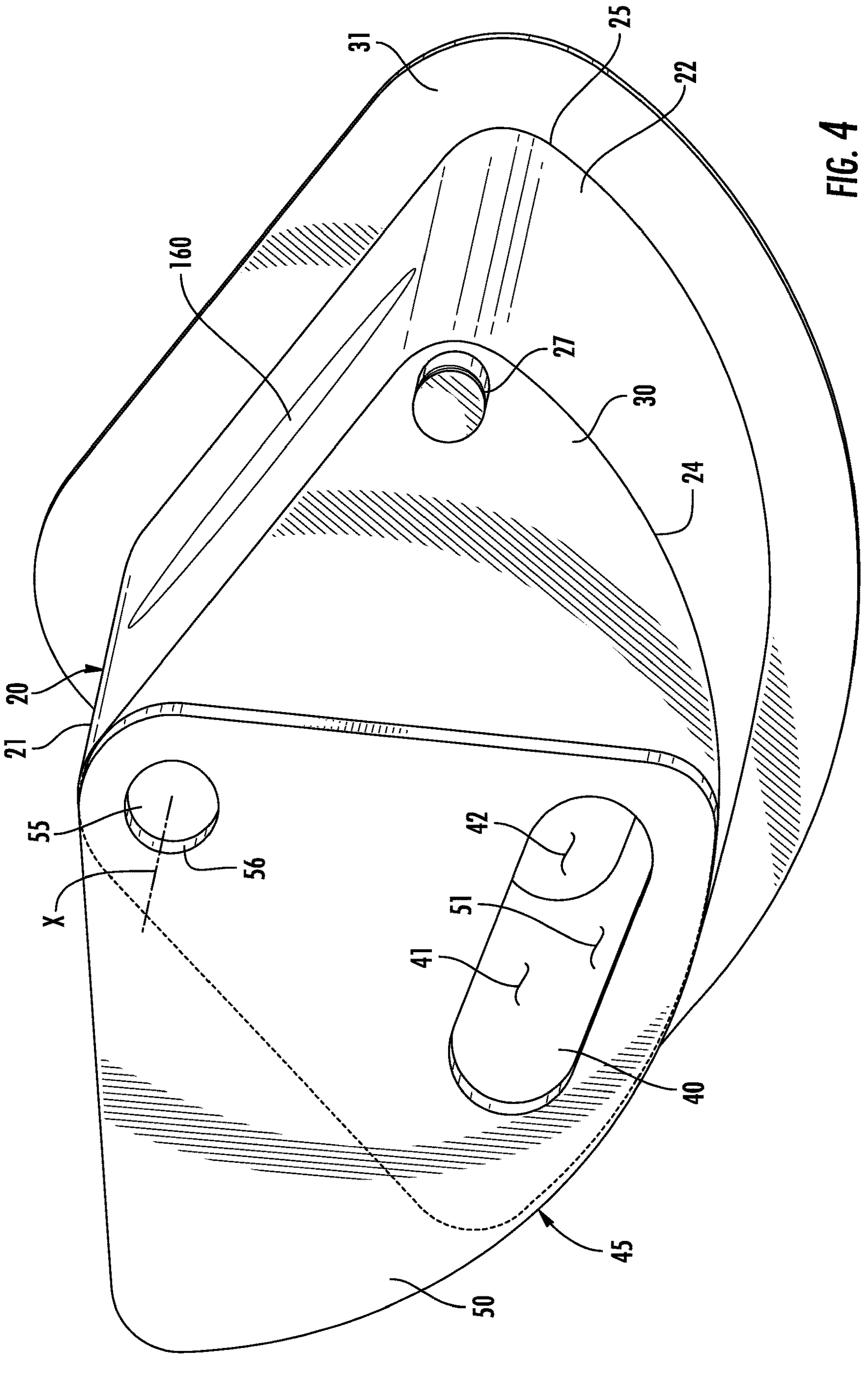
Figure 5:
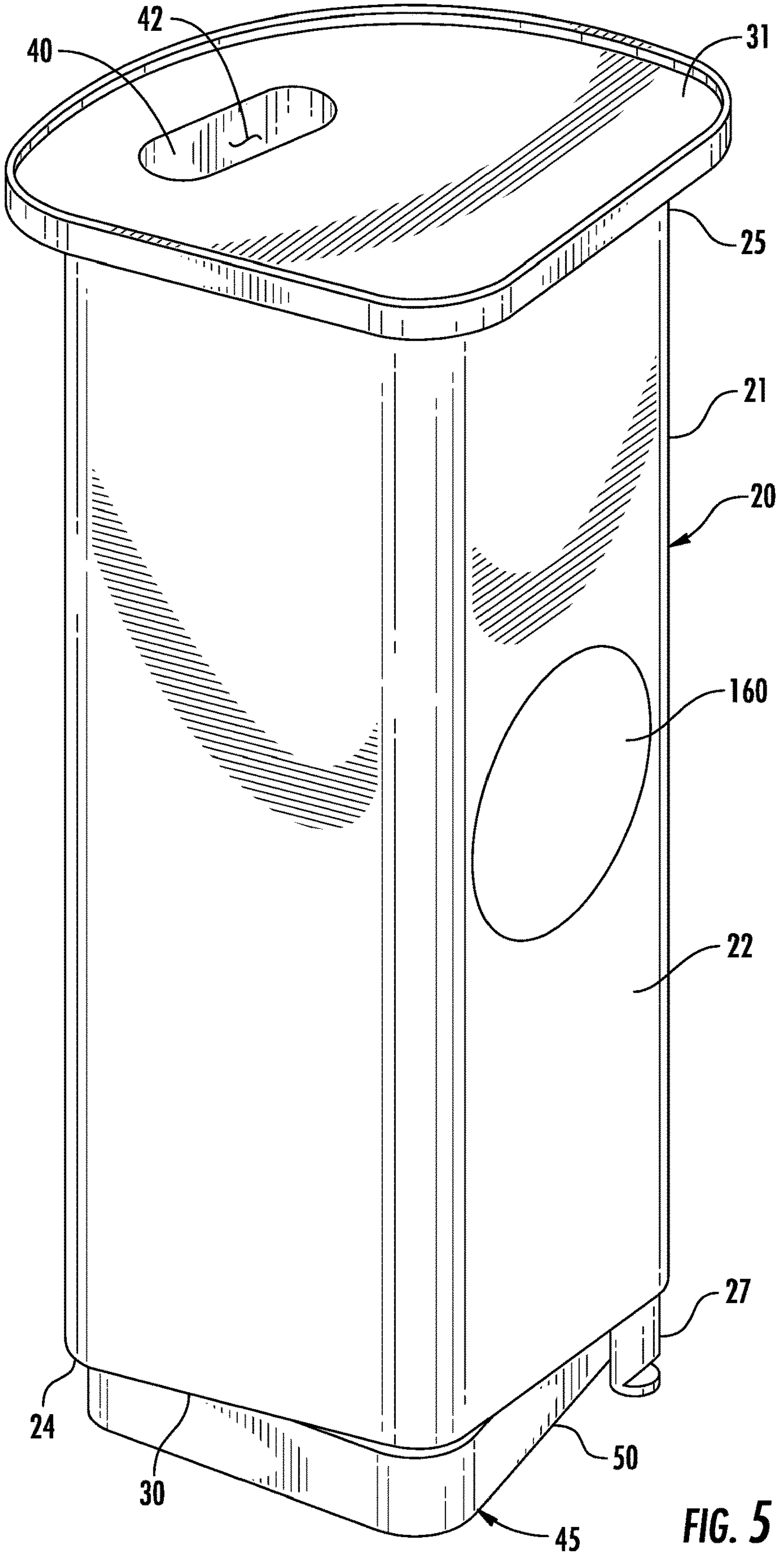

Turning now to the drawings, in which like reference characters indicate corresponding elements throughout the several views, attention is first directed to FIGS. 1-5 illustrating perspective views of a cartridge or container 20 to receive and store pills. Container 20 is configured to be sealed for sealing pills stored therein. The pills are each a small globular or rounded mass of one or more substances, used, for example, in treating a disease or illness, relieving pain or other condition, providing nourishment, or providing another chosen biologically effective result, that is to be swallowed whole. Referring in relevant part to FIGS. 1-5, container 20 is portable, being easily carried or conveyed by hand, and is fashioned of plastic, metal, or other material or combination of materials having inherently strong, rugged, impact-resistant, resilient and food-grade material characteristics. Container 20 includes continuous sidewall 21 having outer surface 22, inner surface 23, lower end 24, and upper end 25. Continuous sidewall 21 extends upright from lower end 24 to upper end 25. Horizontal bottom 30 is affixed to lower end 24. Horizontal top 31 is affixed to upper end 25, which is formed with an attached lid 32. Bottom 30 and top 31 cooperate with inner surface 23 to form volume 35 in FIG. 1. In FIG. 4, container 20 is configured with hollow column 40 structured to receive and store pills in container 20. Hollow column 40, a pill-containment structure, is affixed to bottom 30 and top 31, and extends upright through volume 35 (FIG. 1) from lower opening 41 through bottom 30 to upper opening 42 through top 31. FIG. 5 illustrates lid 32 of FIG. 1 removed revealing upper opening 42 through top 31 and hollow column 40 depending downwardly therefrom. Lid 32 in FIG. 1 is tamper-proof for deterring unauthorized access to hollow column 40 and its contents when it is applied to top 31. Hollow column 40 is configured to receive and store pills therein stacked one atop the other between lower opening 41 and upper opening 42. A pin 37 is affixed to and depends downwardly from bottom 30 at one side thereof proximate to continuous sidewall 21.

Container 20 is equipped with a dispenser mechanism denoted generally at 45. Dispenser mechanism 45 is configured to selectively dispense pills from container 20 and, more specifically, from hollow column 40 of container 20 in the illustrative example. In this example, dispenser mechanism 45 includes an attached shuttle 50. Shuttle 50 is of the same material as container 20 or other chosen material or combination of materials having similar inherent material characteristics and is operatively associated with lower opening 41. Shuttle 50, a flat, plate-like member, is formed with only one pill-receiving opening 51 therethrough. Shuttle 50 is under, and parallel to, bottom 30, and is mounted to bottom 30 for movement relative to lower opening 41 between an unloading position of pill-receiving opening 51 in FIG. 3 and a loading position of pill-receiving opening 51 in FIG. 4.

In this example, shuttle 50 is mounted to bottom 30 for movement between the unloading position of pill-receiving opening 51 in FIG. 3 and the loading position of pill-receiving opening 51 in FIG. 4 with pin 55. Pin 55 is journaled to bottom 30 and is affixed to shuttle 50, in this example in hole 56 in shuttle 50 in FIG. 4. Shuttle 50 and pin 55 are enabled to concurrently rotate about axis X of pin 55 between the unloading position of pill-receiving opening 51 in FIG. 3 and a loading position of pill-receiving opening 51 in FIG. 4. Shuttle 50 is free to rotate into the loading position of pill-receiving opening 51 in FIG. 4 from the unloading position of pill-receiving opening 51 in FIG. 3, and is free to rotate out of the loading position of pill-receiving opening 51 in FIG. 4 to the unloading position of pill-receiving opening in FIG. 3. Pill-receiving opening 51 is displaced away from lower opening 41 and lower opening 41 is closed by shuttle 50 when shuttle 50 is in the unloading position of pill-receiving opening 51 in FIG. 3. Pill-receiving opening 51 is axially aligned with lower opening 41 for receiving a pill therein by gravity from hollow column 40 when shuttle 50 is in the loading position of pill-receiving opening 51 in FIG. 4. Pin 27, a stop, disables shuttle 50 from moving beyond the unloading position of pill-receiving opening 51 as shown in FIG. 3.

Shuttle 50 is initially set to the unloading position of pill-receiving opening thereby closing lower opening 41 in bottom 30, hollow column 40 is charged with pills, top 31 is sealed with lid 32 thereby sealing the contents of hollow column 40 of container 20, and the charged and sealed container 20 is provided to the user/patient in need of or prescribed the pills of container 20. This is all carried out by a pharmacist, physician, or other authorized or substance-controlling party, especially when pills are of a physician-prescribed substance. Column 40 relates to the pills it receives and stores, which enables it to consolidate the pills placed therein in a column stacked one atop the other from a lowermost one of the pills in lower opening 41 and against shuttle 50 to an uppermost one of the pills proximate to upper opening 42 closed by attached lid 32.

Figure 6:
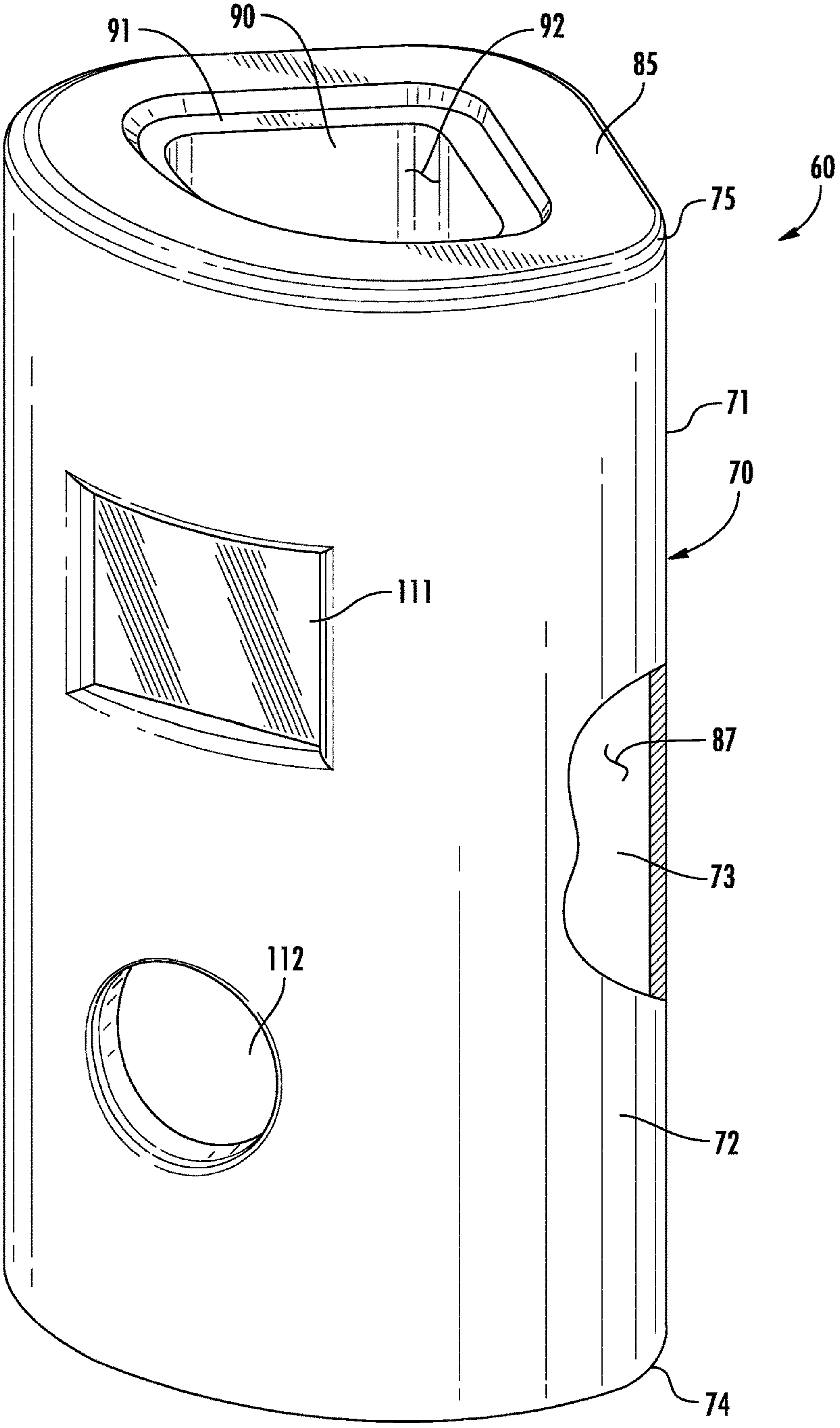
FIGS. 6 and 7 are perspective views of a base constructed and arranged in accordance with the principles of the invention.
Figure 7:
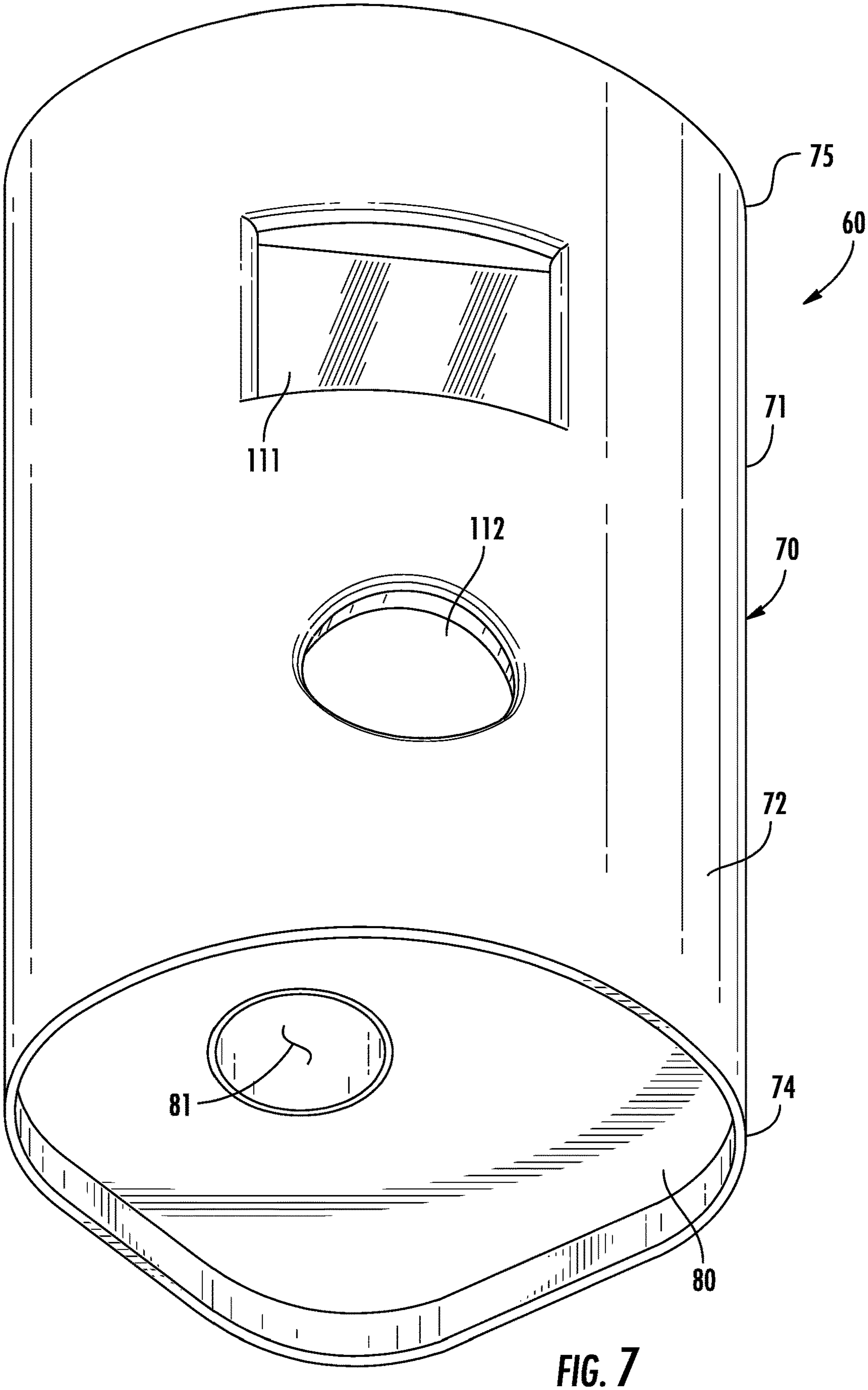

Base 60 in FIGS. 6 and 7 is portable, fashioned of the same material as container 20, and configured to receive/accept container 20 and operate dispenser mechanism 45 to selectively dispense the pill contents of container 20. The assembly of base 60 and container 20 form a pill-dispensing apparatus. Base 60 is also configured to initiate a pill/container verification procedure before base 60 can operate dispenser mechanism 45 to dispense the contents of container 20. According to the invention, base 60 is configured to read/scan a code of container 20, such as upon base 60 receiving container 20, connect to a remote server, and serve the code to the remote server. The remote server is, in turn, configured to receive the code from base 60, verify the code, and retrieve and serve to base 20 dispensing instructions corresponding to the pills of container 20 upon verification of the code. Base 60 is, in turn, configured to receive the dispensing instructions from the remote server, and download and install the dispensing instructions to an onboard storage/memory of base 60 that programs an onboard processor of base 60 to effectuate the dispensing of the pill contents of container 20 by dispenser mechanism 45 under the control of the onboard processor of base 60.

Figure 8:
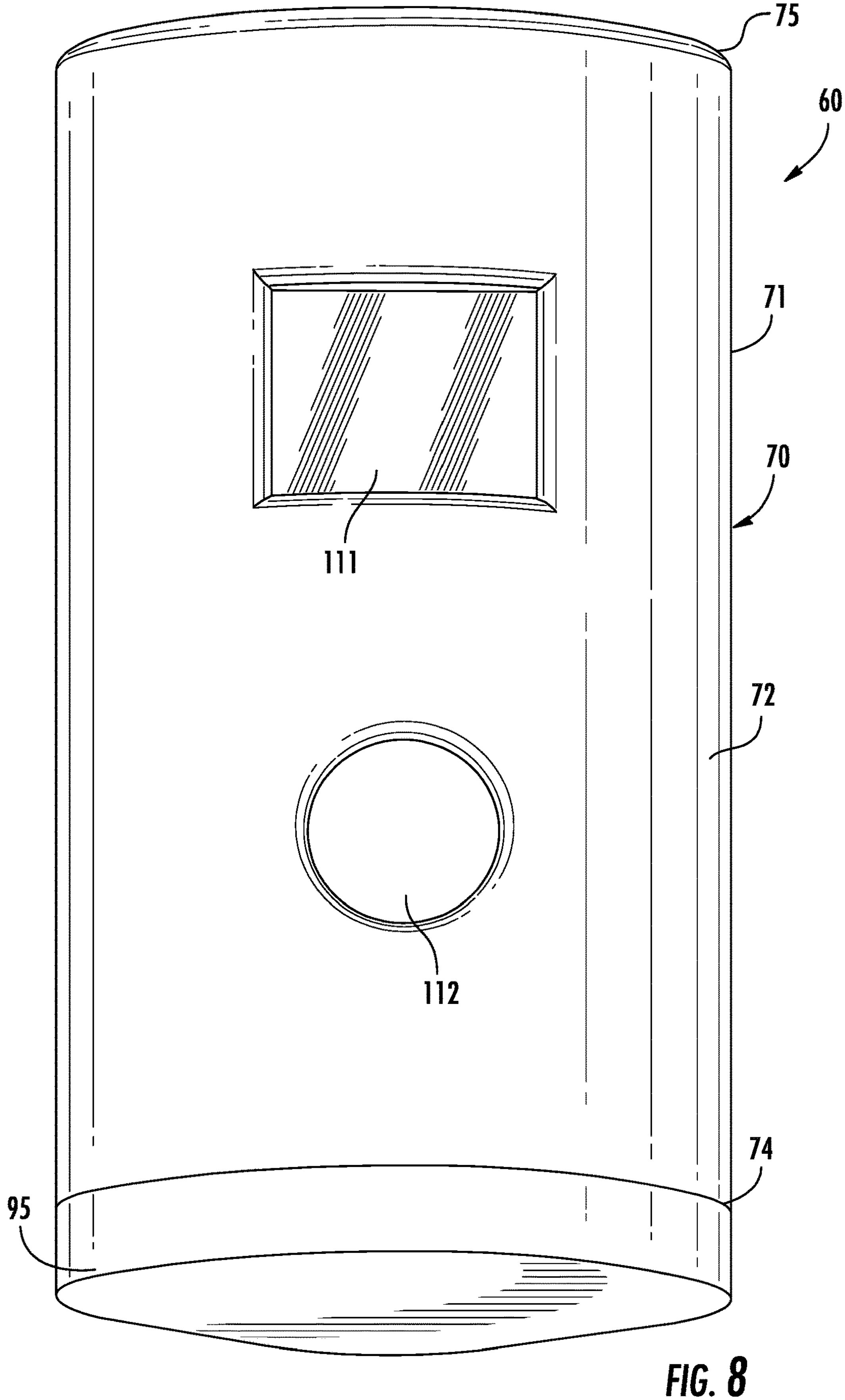
FIG. 8 is a view similar to FIG. 7 illustrating the base as it would appear with an attached pill-collection receptacle.
Figure 9:
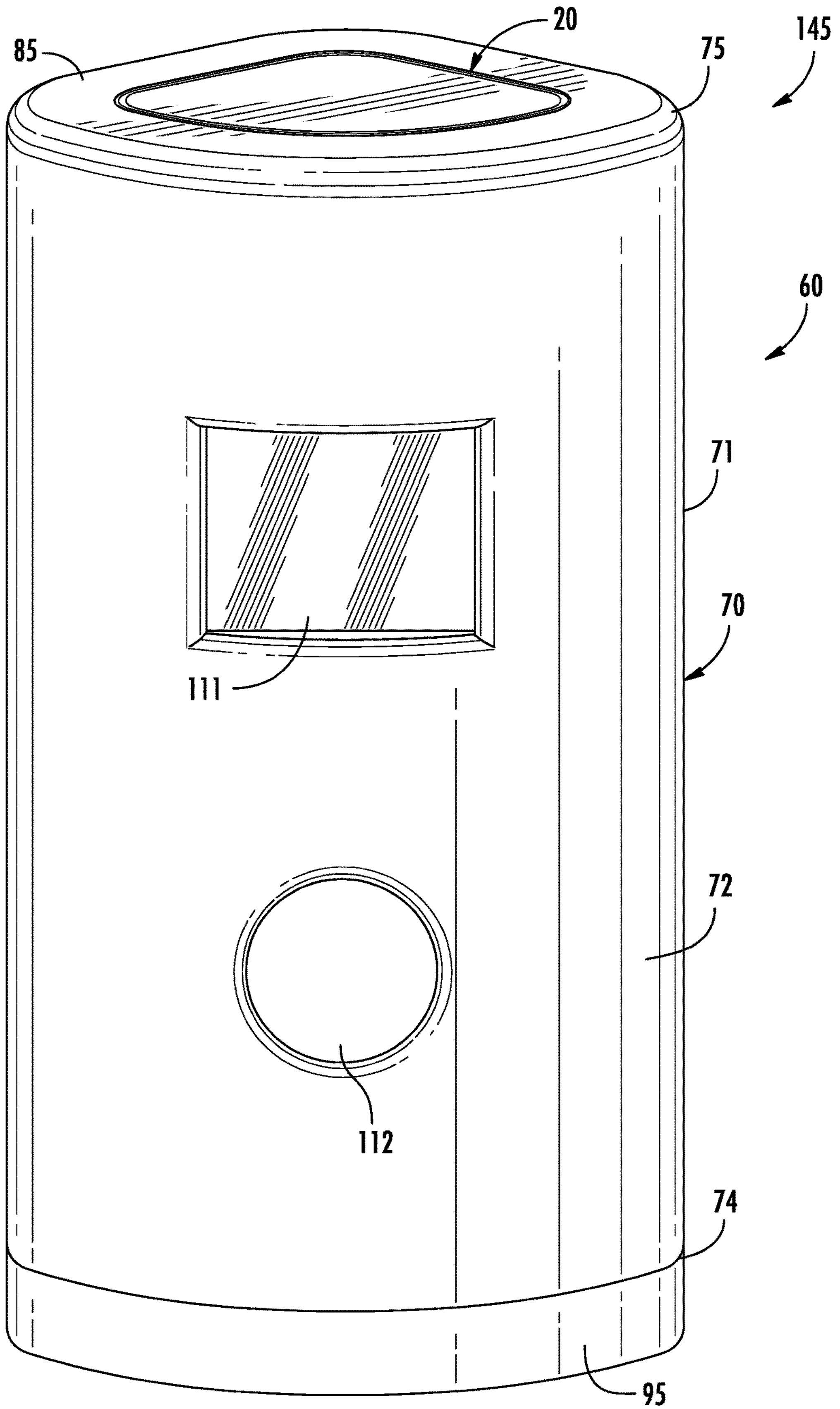
FIG. 9 is a perspective view of the base of FIG. 8 and the container for pills of FIGS. 1-5 shown as they would appear assembled.

Referring in relevant part to FIGS. 6-8, base 60 includes housing assembly 70 including continuous sidewall 71 having outer surface 72, opposed inner surface 73, lower end 74, and upper end 75. Continuous sidewall 71 extends upright from lower end 74 to upper end 75. In FIG. 8, horizontal bottom 80, formed with opening 81 therethrough, is affixed to lower end 74. Opening 81 registers with the previously-described lower opening 41 of bottom 30 of container 20, and pill-receiving opening 51 of shuttle 50 when shuttle 50 is in the unloading position of pill-receiving opening 51, when container 20 is received by base 60 described below. Horizontal top 85 is affixed to upper end 75. Bottom 80 and top 85 cooperate with inner surface 73 to form volume 87 in FIG. 6. Receiver 90 depends into volume 87 from annular seat 91 formed in top 85. Annular seat 91 encircles opening 92 through top to receiver 90, which is configured to accept container 20 therein through opening 92 as shown in FIG. 9 in the assembly of base 60 and container 20 to form the pill-dispensing apparatus. Lower end 74 is configured to releasably receive collection receptacle 95 in FIGS. 8 and 9 for collecting pills that fall therein from opening 81 in bottom 80 as they are dispensed from container 20 by dispenser mechanism 45 one after the other.

Figure 10:
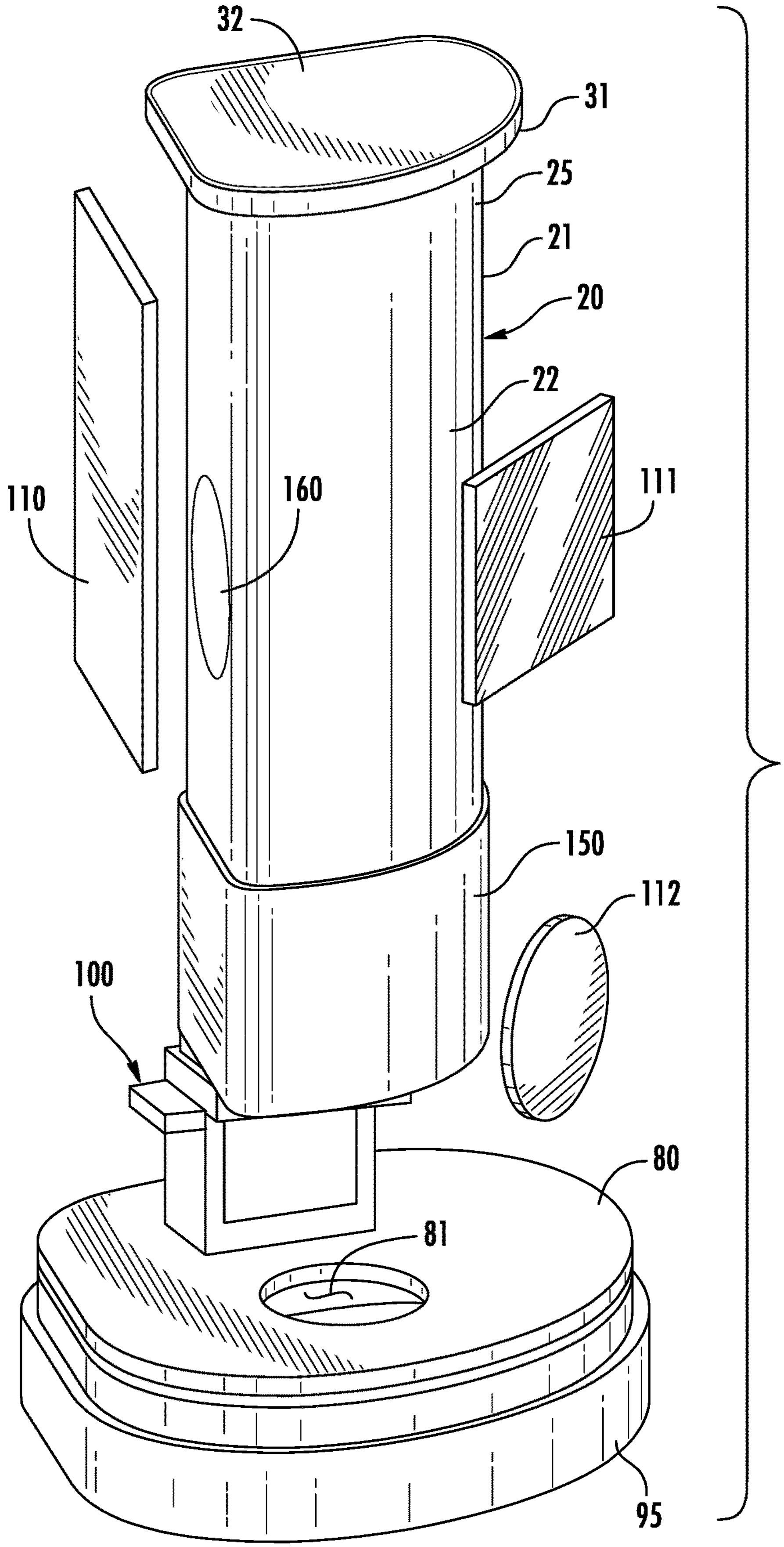
FIGS. 10 and 11 are perspective views corresponding to FIG. 9 with portions of dispensing unit removed for illustrative purposes.
Figure 12:
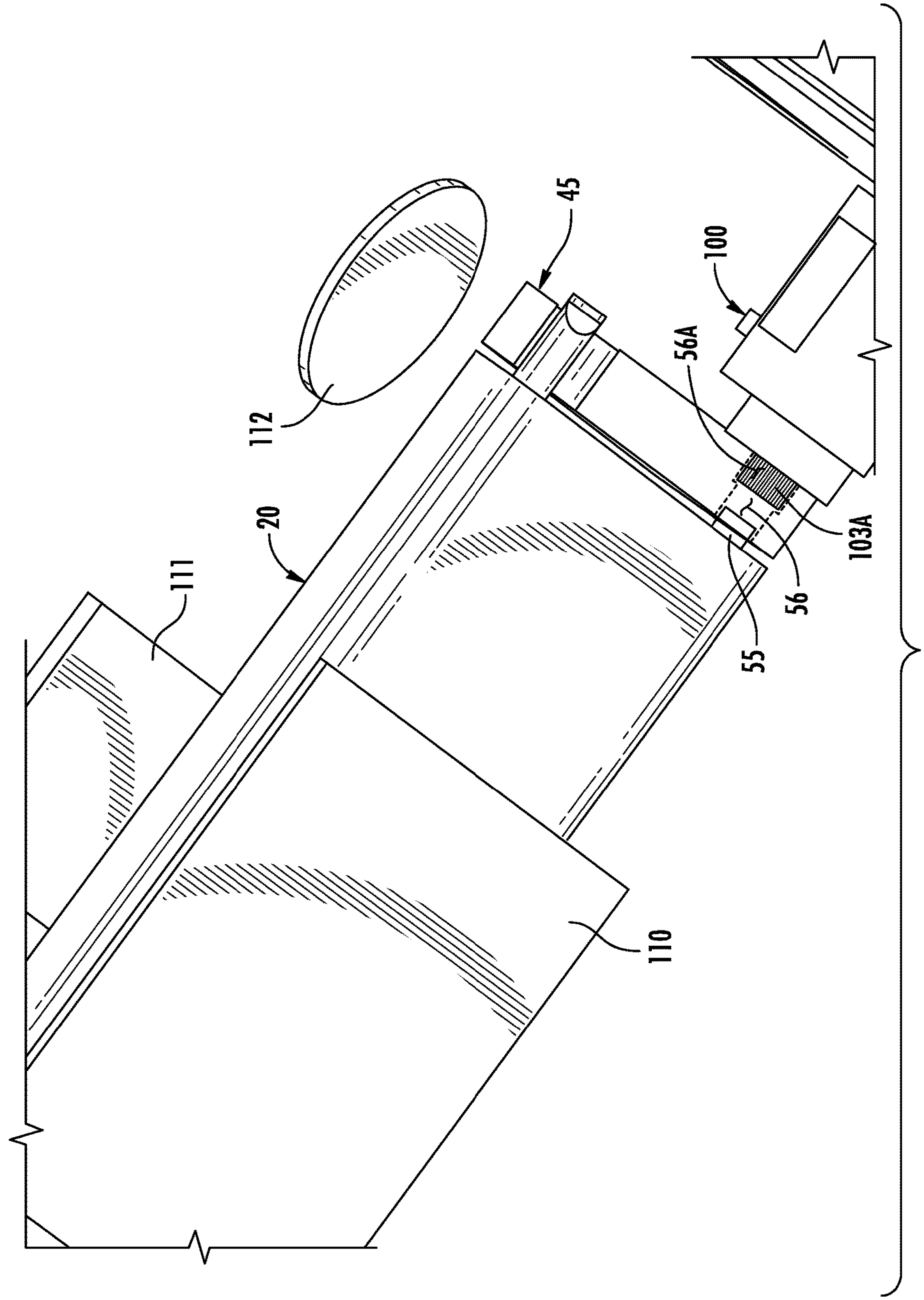
FIG. 12 is an enlarged, fragmentary view corresponding to FIGS. 10 and 11 illustrating an operative coupling of a motor to a dispenser mechanism for dispensing pills from the container.
Figure 13:
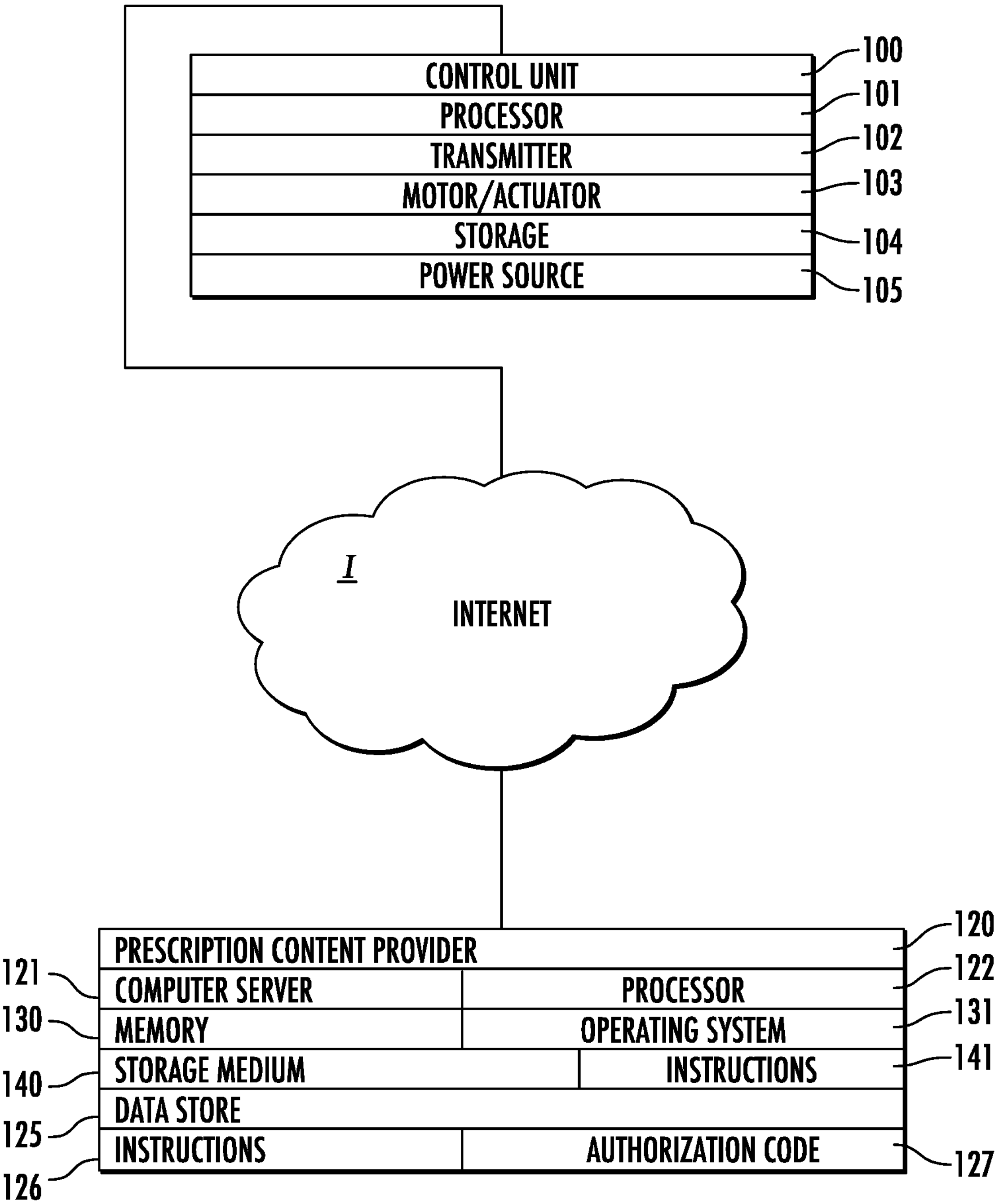
FIG. 13 depicts a hardware and software architecture implementing the invention.

Referring in relevant part to FIGS. 10 and 12, base 60 additionally includes control unit 100 operatively coupled to reader/scanner 110, display/touch screen 111, and at least one biometric device 112, such as a fingerprint or facial recognition device, for enabling user access to base 60 via a biometric interrogation in accordance with known techniques. Referring to FIG. 13, control unit 100 incorporates processor 101, transmitter 102, motor/actuator 103, storage 104, and power source 105. Processor 101, transmitter 102, motor 103, storage 104, reader 110, display screen 111, and biometric device 112 are concurrently powered by an onboard power source 105 of base 60 and are operatively and electrically connected via conventional electrical circuitry/wiring well known to the skilled electrician. Control unit 100 is housed in housing assembly 70 and is mounted atop bottom 80. Reader 110, display screen 111, operable for displaying useful information about the operation of base 60 and for receiving user inputs by touching, and biometric device 112 are carried by continuous sidewall 71 between lower end 74 and upper end 75. Power source 105 is a conventional and long-lasting rechargeable battery or battery pack. Base 60 is web- or networked-enabled via transmitter 102 according to known techniques. Base 60 can include a keypad or other form of user interface for suitably enabling user interaction with base 60.

The electrical components of base 60 operate in a DC-powered environment, and power source 105 is an onboard DC power source consisting of one or more conventional rechargeable batteries, which can be periodically recharged in accordance with known techniques. The conventional electric circuitry/wiring of base 60 can be configured to enable base 60 to run off the power of a dedicated power source when base 60 is plugged into a dedicated power source via a power cord, while at the same time enabling the recharging of the base 60 onboard power source 105. Those having ordinary skill in the art will readily appreciate that any suitable form of battery power source, including any desired or suitable number of batteries, including one or more rechargeable batteries, may be provided and utilized for the power source onboard base 60.

Base 60 is electrically connected via transmitter 102 to a content provider 120 in FIG. 13 by an electronic network, Internet/in this example. Provider 120 includes computer server 121 including at least one processor 122 electronically and operatively coupled to a computer data store 125, a digital computer database of provider 120, which houses dispensing instructions 126 and an authorization code 127 related to the contents of container 20, memory 130 that maintains a standard operating system 131, and a storage medium or memory 140. For clarity, processor 122 can be referred to as a central processor. Dispensing instructions 126 when executed by processor 101 of base 60 cause processor 101 to effectuate a dispensing of the contents from container 20 by the operation of dispenser mechanism 45 under the control of processor 101. The dispensing is a regimented dispensing according to dispensing instructions 126 in an illustrative embodiment for effecting a predetermined regimented dispensing of container 20 contents via dispenser mechanism 45 under the control of processor 101 at the right dose, at the right time, and in the right way and frequency.

The hardware of provider 120 operates under the control of operating system 131 maintained by memory 130 enabling processor 122 to execute instructions 141 maintained by memory 140 to effectuate the operations of processor 122 according to this disclosure. Server 121 can be a cloud server that is built, hosted and delivered through a cloud computing platform over Internet I, and thereby being accessible from one or more authorized visiting computers for creating and managing data store 125 and its contents.

Dispensing instructions 126 specifically relate to the contents of the container 20, i.e. the substance/material of pills of container 20, and are entered into data store 125, preferably by an authorized individual/party, from a user computer, workstation, or other input device in communication with content provider 120. A webpage interface can be implemented as a portal or gateway for inputting data/information/instructions into data store from the chosen input device. Accordingly, dispensing instructions 126 when executed by processor 101 of base 60 cause processor 101 to effectuate a dispensing of the container 20 contents via dispenser mechanism 45. In an illustrative embodiment, the dispensing is a regimented dispensing according to dispensing instructions 126 for effecting a predetermined regimented dispensing of container 20 contents via dispenser mechanism 45 under the control of processor 101 at the right dose, at the right time, and in the right way and frequency. The dispensing regimen is chosen for the specific substance embodied in the pills of container 20, and can vary from substance to substance, e.g. from medication to medication.

Storage medium or memory 140 includes executable instructions 141 stored thereon that when executed by processor 122 in response to inputs from processor 101 of base 60 interacting with provider 120 through Internet I cause processor 122 to effectuate the operations of provider 120. Instructions 141 program processor 122 to enable processor 122 effectuate its described operations of provider 120 disclosed herein. Medium 140 can take on a variety of forms. For instance, medium 140 may take the form of program code (i.e., instructions 141) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, computer-readable storage medium 140 is non-transitory, is not a signal, is not a transient signal, and is not a propagating signal. Medium 140 described herein is an article of manufacture. The hardware of provider 120 operates under the control of operating system 131 maintained by memory 130 enabling processor 122 to execute instructions 141 to effectuate the operations of provider 120 described with particularity in this disclosure.

Processor 122 of provider 120 is coupled to data store 125 and is in communication with processor 101 of base 60 through Internet I. Processor 122 is programmed to receive from processor 101 of base 60 a code associated with container 20, compare the code to authorization code 127, and retrieve and serve instructions 126 to processor 101 of base 60 through Internet I upon the code matching authorization code 127 thereby verifying container 20 and its contents. The code of container 20 and the authorization code are chosen by an authorized party, and are identical. In addition to instructions 126, additional information housed by data store 125 and related to the substance of the pills of container 20 can accompany instructions 126, such as the user's/patients name, address, insurance carrier, caregiver, prescribing physician, etc., and an identification of the pills and related prescription information. This information is accessible at data store 125 by a pharmacist or other authorized party through Internet/from a visitor computer for enabling the pharmacist or chosen authorized party to charge container 20 with the appropriate contents in advance.

Processor 101 of base 60 is programmed to receive instructions 126 from processor 122 of provider 120 and, upon receiving instructions 126 from processor 122 of provider 120, to download instructions 126 to memory 104 of base 60 and execute instructions 126 to effectuate the dispensing of the contents from container 20 by dispenser mechanism 45 operatively associated with container 20. When additional information related to the substance of the pills of container 20 accompanies instructions 126, that information is additionally downloaded to memory 104. The actions of processors 101 and 122 as described above and throughout this disclosure all preferably occur automatically without the need for user inputs or other user intercessions unless otherwise noted or qualified.

Instructions 126 are executable/program instructions. Storage medium or memory 104 includes executable instructions 126, when downloaded thereon, that when executed by processor 101 of base 60 cause processor 101 to effectuate the operations of base 60. Instructions 126 program processor 101 to enable processor 101 to effectuate its described operations of base 60 disclosed herein. Medium 104 can take on a variety of forms. For instance, medium 104 may take the form of program code (i.e., instructions 126) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, computer-readable storage medium 104 is non-transitory, is not a signal, is not a transient signal, and is not a propagating signal. Medium 104 described herein is an article of manufacture. The hardware of base 60 operates under the control of an onboard operating system maintained by memory 104 or other memory of base 60 enabling processor 101 to execute instructions 126 to effectuate the operations of base 60 as described herein.

Receiver 90 of housing assembly 70 shown in FIG. 6 is configured to accept container 20 therein as shown in FIG. 9 in the assembly of base 60 and container 20 to form the pill-dispensing apparatus 145. Container 20, and its appurtenances and charge of contents, is installed shuttle 50 first into receiver 90 through opening 92. Top 31 occupies opening 92 and fits in annular seat 91 formed in top 85 of housing assembly 70 and shuttle 50 operatively connects to motor 103 of base 60, upon installation of container 20 in receiver 90 of base 60. Actuation of motor 103 imparts corresponding movement of shuttle 50 between the unloading position of pill-receiving opening 51 and the loading position of pill-receiving opening 51. If desired, a locking mechanism can be provided for locking container 20 in place to base 60 upon assembling container 20 and base 60. This mechanism can be a detent, a mechanism that temporarily holds container 20 to base 60. Pin 27 can form a part of such a detent.

Figure 11:
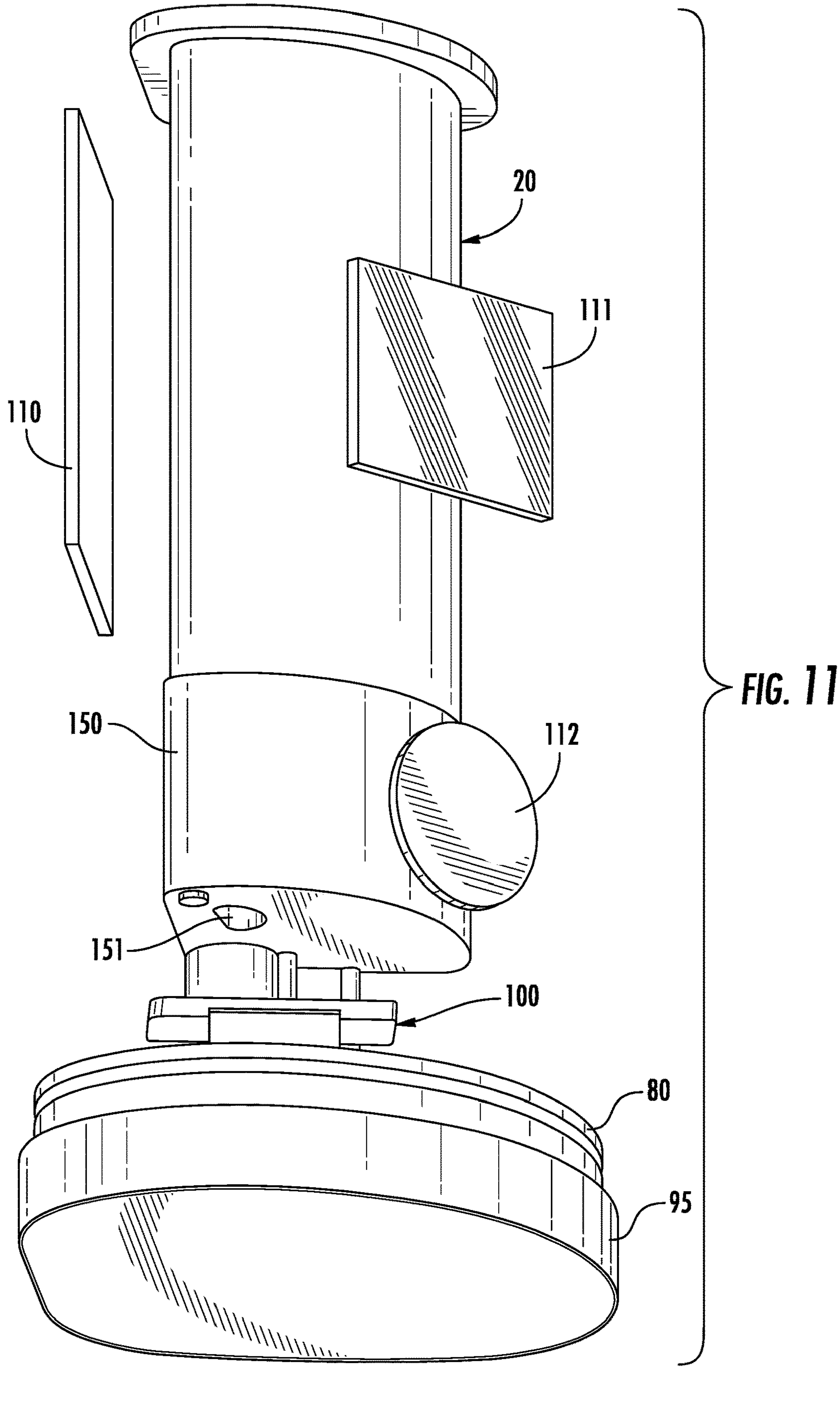

In FIGS. 10 and 11, a cup-shaped cap 150 is applied over shuttle 50 (not shown in FIG. 10) and lower end 24 (not shown) of container 20. Cap 150 encloses shuttle 50. Cap 150 can be removably attached, such as by being fitted frictionally over lower end 24 of container 20 or threaded over lower end 24 of container 20 for example, or permanently affixed to lower end 24 of container 20, such as by welding, heat-bonding, by adhering cap 150 to container 20 by a permanent adhesive, or the like. Shuttle 50 is free to translate between the loading unloading positions of pill-receiving opening 51 without interference from cap 150. Upon installation of container 20 in receiver 90 of base 60, drive shaft 103A of motor 103 passes through an appropriate opening through the bottom of cap 150 and, as shown in FIG. 12, keys into counterbore 56A of hole 56 thereby operatively coupling/connecting motor 103 to shuttle 50, wherein actuation of motor 103 rotates shaft 103A in opposite directions thereby imparting rotation of shuttle 50 between the unloading and loading positions of pill-receiving opening 51. Counterbore 56A, an engagement element, and drive shaft 103A, a complemental engagement element, join in the assembly of container 20 and base 60 to form a transmission operatively coupling motor 103 to shuttle 50. In alternate embodiments, other forms of engagement and complemental engagement elements suitable for operatively connecting motor 103 to shuttle 50 in the assembly of container 20 and base 60 can be used to form a transmission for transferring power from motor 103 to shuttle 50, such as complementing gears, gearing assemblies, complementing male and female engagement pairs, or the like.

Figure 14:
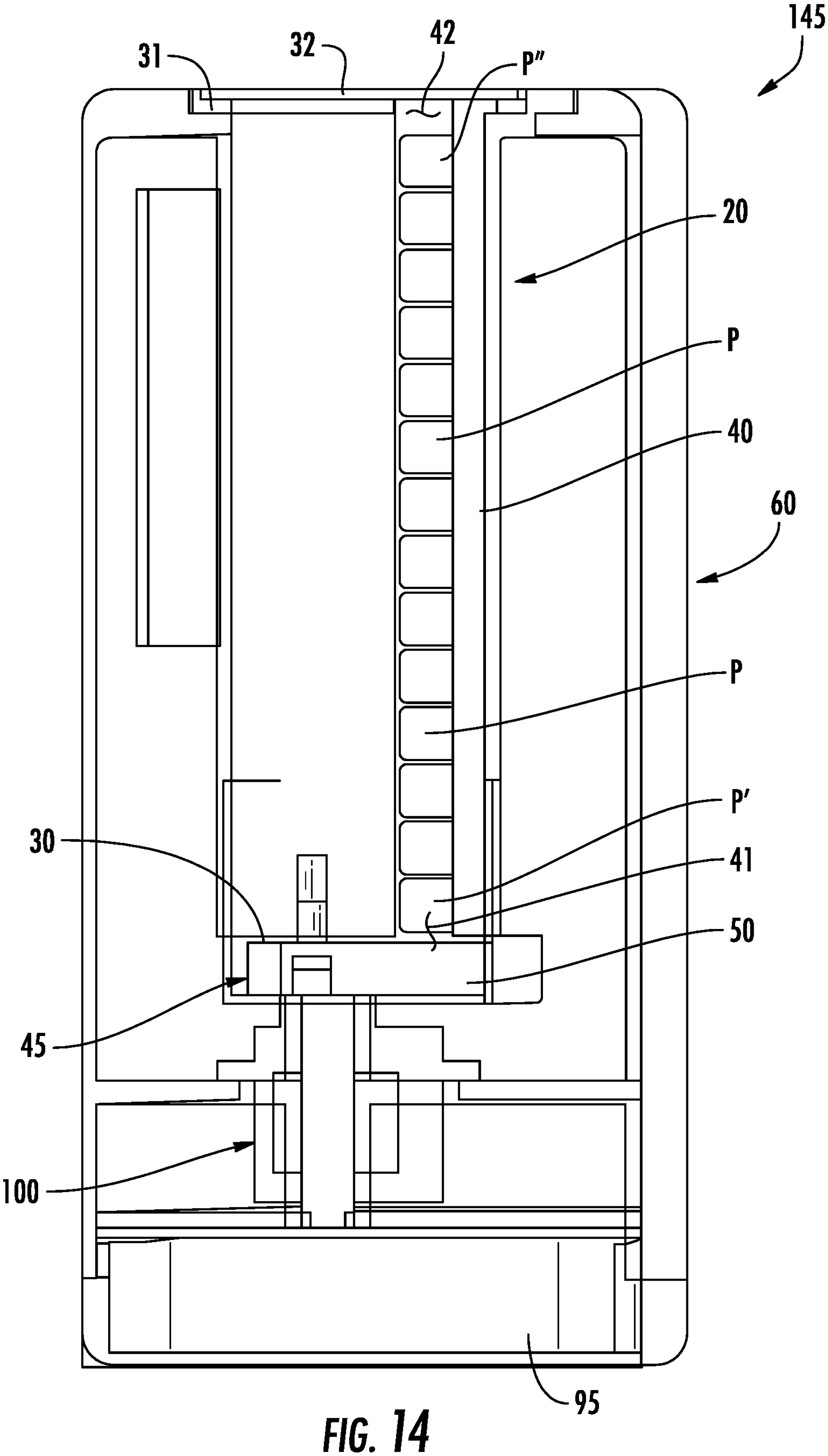
FIG. 14 is a schematic representation of the embodiment of FIG. 9.

In the operation of base 60, shuttle 120 is initially set to the unloading position of pill-receiving opening 51 away from lower opening 41 of hollow column 40 charged with pills P stacked one atop the other between lower opening 41 and upper opening 42 in FIG. 14. Pills P are stacked one atop the other in hollow column 40, again from a lowermost one of pills P' in lower opening 41 and against shuttle 50 to an uppermost one of pills P" proximate to upper opening 42 closed by attached lid 32. The lowermost pill P' of the column of pills P in lower opening 41 atop shuttle 50 is the first pill to be loaded. Shuttle 50 and bottom 30 are sufficiently juxtaposed to disable the lowermost pill from discharging from lower opening 41, thereby effectively closing lower opening 41 with the lowermost pill applied therein. The remainder of pills P of the column of pills P extend upwardly through hollow column 40 from the lowermost pill p'. Upon movement of shuttle 50 by motor 103 from the unloading position of pill-receiving opening 50 to the loading position of pill-receiving opening 50 registered with lower opening 41, the column of pills P drops under its inherent weight and the lowermost pill P' drops from lower opening 41 into pill-receiving opening 51 of shuttle and onto cap 150 and the next pill P in the column of pills P enters lower opening 41. Upon movement of shuttle 50 by motor 103 from the loading position of pill-receiving opening 50, now loaded with pill P', to the unloading position of pill-receiving opening 50, shuttle 50 drags the pill P' loaded in pill-receiving opening 50 across the bottom of cap 150 to discharge opening 151 through the bottom of cap 150 thereby axially aligning pill-receiving opening 51 and the pill applied therein with discharge opening 151 of cap 150 and opening 81 through bottom 80 of housing assembly 70, whereby the pill P' drops under its inherent weight through discharge opening 141 from pill-receiving opening 51 and into collection receptacle 95 through opening 81 in bottom 80. At the same time, shuttle 50 closes lower opening 41 and the next lowermost pill P of the column of pills P in lower opening 41 rests on shuttle 50, is the next pill to be loaded, and the other pills P forming the remainder of the column of pills P extend upwardly through hollow column 40 from the lowermost pill P. Collection receptacle 95 is withdrawn from housing assembly 70, the pill P' therein in this example is removed and ingested, and the collection receptacle 95 is reattached. This pill-dispensing cycle is repeated for each pill P at each pill-dispensing session until the pills P are depleted. Container 20 can be removed from base 60 and refilled as needed.

According to the invention, processor 122 in FIG. 13 is coupled to data store 125 and is in communication with processor 101 through Internet I. Processor 122 is programmed by instructions 141 to receive from processor 101 a code associated with container 20, compare the code to authorization code 127, and retrieve and serve instructions 126 to processor 101 upon processor 122 matching code with authorization code 127 thereby authenticating/verifying container 20 and its charge of pills P. Processor 101 is programmed by the onboard operating system to receive instructions 126 from processor 122, download instructions 126 to storage 104 upon processor 101 receiving instructions 126 from processor 122, and execute instructions 126 to effectuate the dispensing of the pills from container 20 at predetermined times by motor 103 operating dispenser mechanism 45 at the control of processor 101. Each pill-dispensing session can initiate automatically under the control of processor 101 executing instructions 126, or in response to inputs from a patient interacting with base 60. User interaction with base 60 can require an authentication event, such as entry of a key code via display/touch screen 111, and or at least one biometric interrogation by biometric device 112, or the like, to ensure the user/patient is authorized to take the pills dispensed from container 20.

Processor 101 is configured to read/scan a code of container 20 by reader 110, such as upon base 60 receiving container 20, connect to processor 122 of server 121, and serve the code to processor 122 of server 121. Processor 122 of server 121 is, in turn, configured to receive the code from base 60, verify the code, and retrieve and serve to base 20 dispensing instructions 126 corresponding to pills P of container 20 upon verification of the code. Processor 101 of base 60 is, in turn, configured to receive dispensing instructions 126 from processor 122 of server 121, and download and install instructions 126 to storage 104 of base 60 that programs processor 101 to effectuate the dispensing of the pill contents of container 20 by dispenser mechanism 45 under the control of processor 101, whether automatically or in response to user inputs/commands. This characterizes a code interrogation and processor 101 programming operation according to the invention.

The code corresponding to container 20 is carried by container 20, and processor 101 operatively coupled to reader 110 is programmed to read the code on container 20 by reader 110 and issue the code via transmitter 102 through Internet I to processor 122. More specifically, processor 101 is programmed by the onboard operating system to read the code on container 20 by reader 110 proximate to or upon assembling container 20 and base 60, connect through Internet I via transmitter 102 to processor 122, and issue the code to processor 122. In an exemplary embodiment, processor 101 is programmed by the onboard operating system to automatically read the code on container 20 by reader 110 proximate to or upon assembling container 20 and base 60, automatically connect through Internet/via transmitter 102 to processor 122, and automatically issue the code to processor 122 without the need for user inputs or commands.

In an illustrative embodiment, reader 110 is an RFID reader, and the code is housed as digital data on an RFID tag 160 carried by container 20 as shown in FIGS. 1, 2, 5, and 10. In this embodiment, RFID tag 160 transmits its digital data to RFID reader 110 upon RFID tag 160 being triggered by an electromagnetic interrogation pulse from RFID reader 110, and processor 101 issues the code to processor 122 via transmitter 102 through Internet I. Preferably, RFID reader 110 under the control of processor 101 automatically issues its electromagnetic pulse proximate to or upon assembling container 20 and base 60 when RFID reader 110 and RFID tag 160 are juxtaposed in proximity to one another, RFID tag 160 automatically transmits its digital data to RFID reader 110 upon RFID tag 160 being triggered by the electromagnetic interrogation pulse from RFID reader 110, and processor 101 automatically issues the code to processor 122 via transmitter 102 through Internet I.

RFID tag 160 and RFID reader 110 are sufficiently juxtaposed or otherwise in proximity to one another upon assembling container 20 and base 60 to enable RFID reader 110 to automatically detect RFID tag 160 and to cause processor 101 to issue the electromagnetic interrogation pulse by RFID reader 110 in response. In this example, RFID reader 110 is carried by continuous sidewall 71 between lower end 74 and upper end 75 of housing assembly 70, and RFID tag 160 is carried by continuous sidewall 21 between lower end and upper end 25, whereby RFID reader 110 and RFID tag 160 are operatively juxtaposed upon assembly of container 20 and base 60. RFID tag 160 and RFID reader 110 can be positioned elsewhere consist with the teachings herein.

In accordance with known techniques, processor 101 is programmed to record the operations of base 60 in storage 104. The operations of base 60 recorded in storage 104 document/record the user's/patient's compliance or non-compliance in taking the pills P. Processor 101 can be programmed to automatically transmit the information electronically via transmitter 102 through Internet/from storage 104 to processor 122 that can be programmed to automatically store the information into the user's/patient's electronic record housed in data store 125. The electronic record can be accessed by an authorized party, the user's/patient's physician or caregiver, through Internet I from a visitor computer to monitor the operations of the pill-dispensing system for tracking and monitoring patient compliance.

By way of example, provider 120 is configured with one data store 125 including instructions 126 and authorization code 127 related to the chosen contents of container 20 and a user/patient in need of the chosen contents of container 20. Data store 125 relates to a specific user/patient intended to take the pills of container 20 and the specific substance of pills. Data store 125 can be configured with instructions and authorization codes for a plurality of pill substances for a given user/patient, such as medicinal substances, vitamin substances, pain-reliever substances, etc.

In an illustrative embodiment, the substance of the pills of container 20 is chosen to treat a disease or illness, relieve pain or other condition, provide nourishment, or provide another chosen biologically effective result in the use/patient as disclosed herein. The effectiveness of the substance of the pills in a user is often determined by a presence or an extent of a presence of a condition of or substance in a biological sample of the user, such as a sample of the user's blood, urine, breath, spittle, blood pressure, etc. Depending on the presence or extent of a presence of a given condition of or substance in a biological sample of the user, user compliance in taking the pills of container 20 and/or the biological effectiveness of the substance of the pills of container 20 can be determined.

As a matter of example, diabetes is a group of metabolic diseases characterized by a high blood sugar level over a period of time. Medications used to treat diabetes act by lowering blood sugar levels. A glucose meter is a measurement device used to measure the approximate concentration of glucose in a blood sample for indicating the effectiveness of a medication used to treat diabetes. In another example, hypertension is a long-term medical condition characterized by a persistent elevation of blood pressure. A sphygmomanometer is a measurement device used to measure blood pressure of an artery for indicating the effectiveness of a medication used to treat blood pressure, in which the blood pressure of the chosen artery is a biological sample. Other measurable conditions treatable by medication will readily occur to the skilled medical practitioner.

Figure 15:
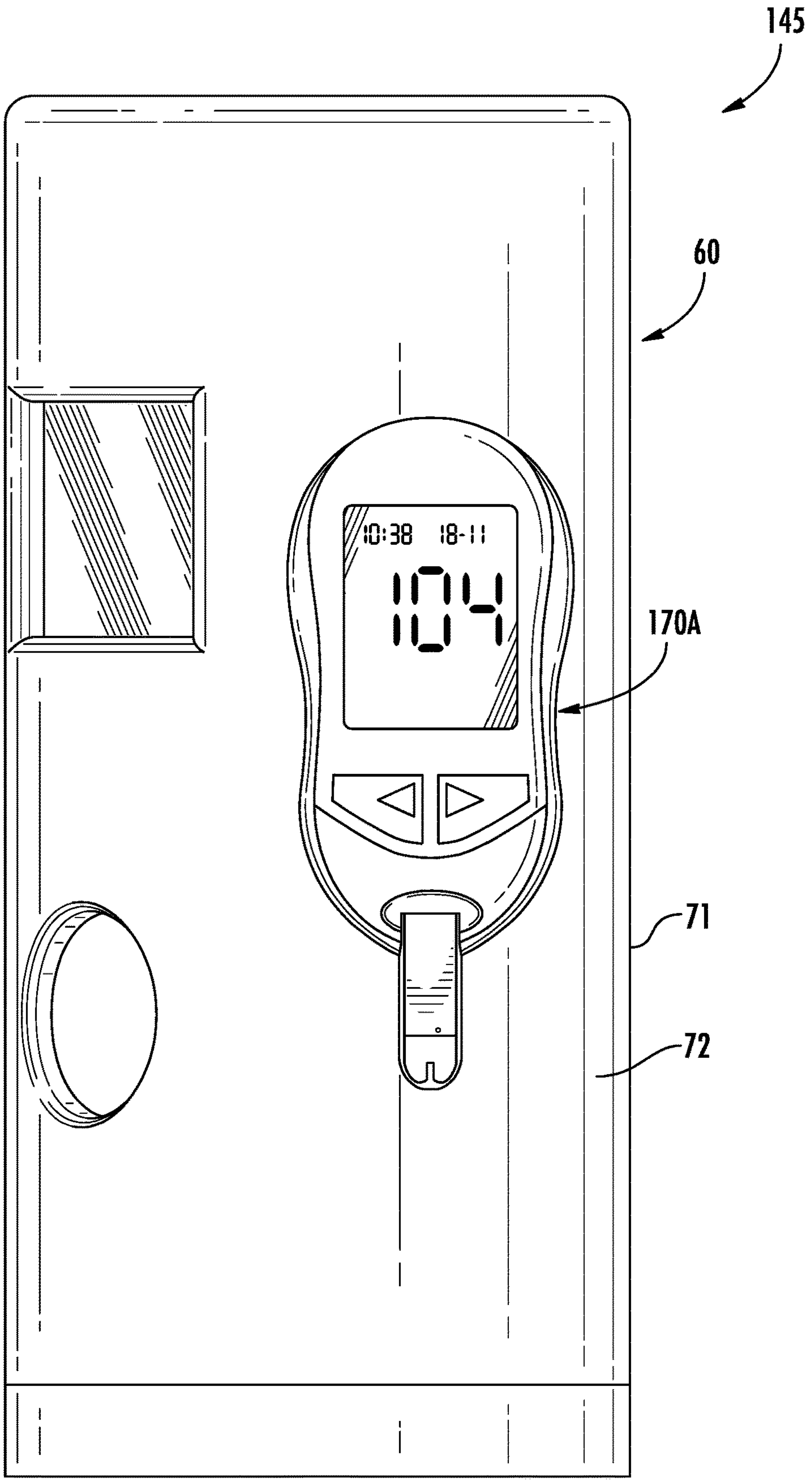
FIG. 15 illustrates the embodiment of FIG. 9 configured with a measurement device for determining a presence or an extent of a presence of a condition or a substance in a biological sample.

In an illustrative embodiment, FIG. 15 shows base 60 of pill-dispensing apparatus 145 configured with a measurement device 170. Measurement device 170 relates to the pills of container 20. Measurement device 170 is powered by an onboard power source and/or by power source 105 of base 60, and is operatively connected to processor 101 wirelessly or via conventional electrical circuitry/wiring or a power cord well known to the skilled electrician. Measurement device 170 is attached to and carried by continuous sidewall 71 of base 60 and extends outwardly from outer surface 72. Measurement device 170 can be permanently attached to or integrated with base 60, or releasably attached, such as by a cradle or other releasable coupling. Measurement device 170 can also be separate and operatively coupled to base 60 simply with a power cord or wirelessly as intimated above.

Measurement device 170 is configured to accept and interact with a biological sample to determine a presence or an extent of a presence of a condition of or substance in the biological sample. In this embodiment, processor 101 is programmed by the onboard operating system of base 60 or instructions 126 to receive a reading from measurement device 170 upon measurement device 170 taking a reading of a presence or an extent of a presence of a condition of or a substance in the biological sample of the user of the pills of container 20, connect to processor 122 of server 121, and serve the reading to processor 122 of server 121. Processor 122 is, in turn, programmed to receive from processor 101 of base 60 the reading of measurement device 170, compare the reading to a normal reading or normal reading range housed in data store 125, and, if desired, automatically store the reading and the comparison into the user's electronic record housed in data store 125. In an illustrative embodiment, processor 122 can be programmed to issue an alert or message, such as email message, text message, and/or voice message, to an authorized email address and/or phone number to alert the intended recipient of the reading, user non-compliance and/or the comparison. Upon receiving the alert, the intended recipient can contact the user to address user non-compliance and/or a possible biological ineffectiveness of the pills in the user, and/or instruct the user to have container 20 refilled with replacement pills designed to provide or improve the intended biologically-effective result in the user. The dispensing information 126 can also be accessed at data store 125 by the recipient of the alert or other authorized individual or party from a visitor computer to change/update instructions 126 as appropriate.

In the illustrative embodiment of FIG. 15, the substance of pills of container 20 of pill-dispensing apparatus 145 is diabetes medication for lowering blood sugar levels, and measurement device 170 is a conventional glucose meter 170A used to measure the approximate concentration of glucose in a blood sample for indicating the effectiveness of the medication of the pills of container 20. Use of the glucose meter 170A illustrated in FIG. 15 is conventional and well known and is therefore not discussed herein. Any standard or chosen glucose meter can be used.

Figure 16:
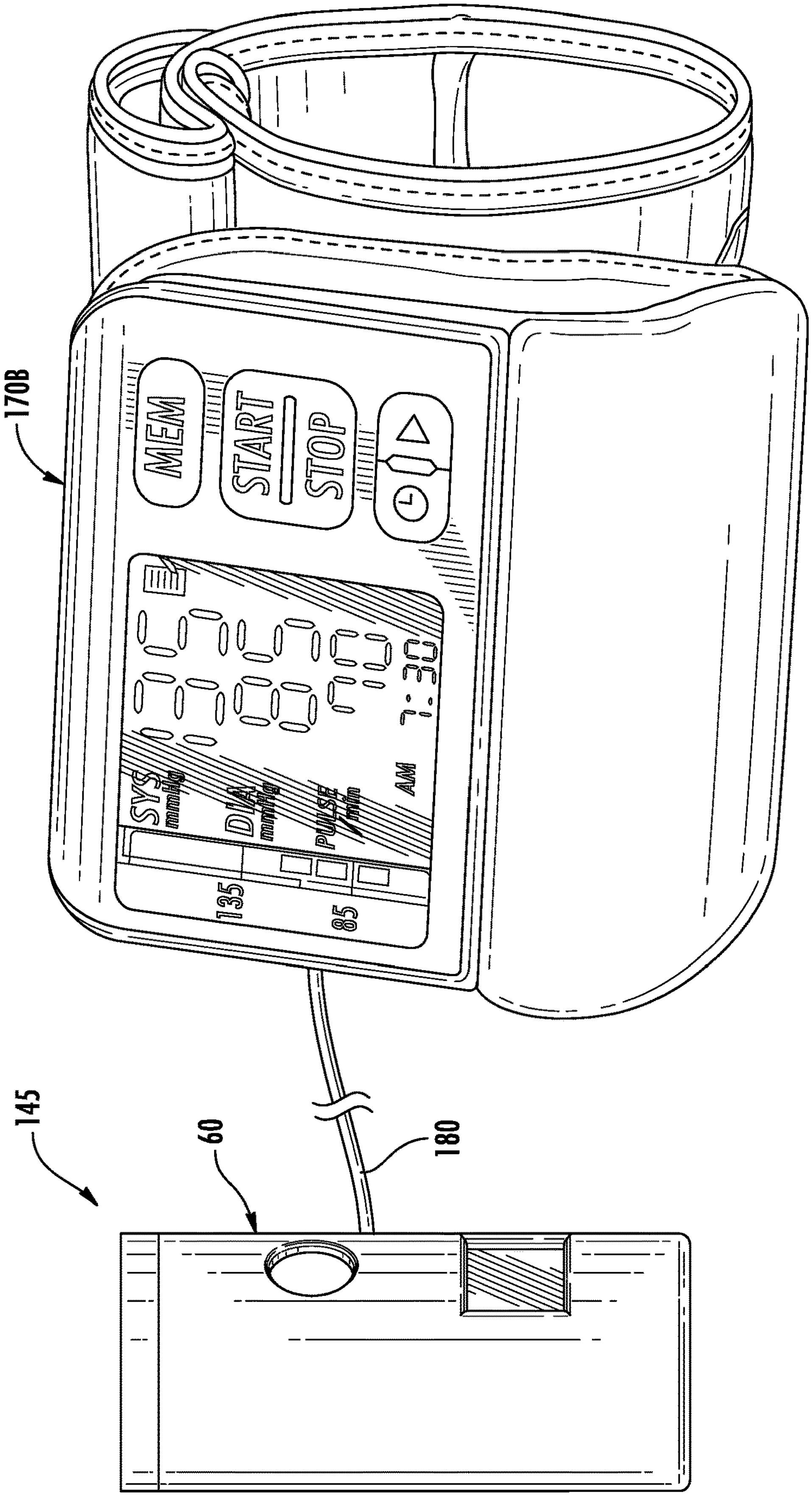
FIG. 16 illustrates the embodiment of FIG. 9 configured with an alternate embodiment of a measurement device for determining a presence or an extent of a presence of a condition or a substance in a biological sample.

In another example, the substance of pills of container 20 of pill-dispensing apparatus 145 is medication for lowering blood pressure, and measurement device 170 is a conventional sphygmomanometer 170B in FIG. 16 used to measure blood pressure of an artery for indicating the effectiveness of the medication of the pills of container 20. Use of the sphygmomanometer 170B illustrated in FIG. 16 is conventional and well known and is therefore not discussed herein. In this embodiment, sphygmomanometer 170B is operatively connected to base 60 by a conventional power cord 180. A wireless connection can be used if so desired. Any standard or chosen sphygmomanometer can be used.

Those having regard for the art will readily appreciate that the measurement device can be chosen for determining a presence or an extent of a presence of a condition or a substance in any chosen biological sample of the user depending on the substance of the pills of container 20 and the condition the substance of the pills of container 20 is intended to address.

The invention is described above with reference to illustrative embodiments. However, those skilled in the art will recognize that changes and modifications may be made in the described embodiments without departing from the nature and scope of the invention. For instance, container 20 and base 60 can take on any desired form or design consistent with this disclosure. Further, dispenser mechanism 45 disclosed herein is suitable in that it is efficient, simple in structure, and inexpensive. Other suitable dispenser mechanisms can be used to dispense pills from container 20 in alternate embodiments without departing from the invention. In the illustrative embodiment disclosed herein, reader 110 is an RFID reader and the code is embodied as digital data on RFID tag 160. Other forms of readers/scanners and tags/barcodes can be used without departing from the invention according to the teachings of this disclosure. For instance, the code can be a barcode carried by container 20, and reader 110 can be a corresponding barcode reader. In another embodiment, the code can be a biometric code, such a fingerprint or iris-scan of the user/patient assigned to the contents of container 20, and reader 110 can be a corresponding fingerprint or iris-scan reader. Any suitable form of code and corresponding reader can be implemented with the invention. Additionally, the various appurtenances of a base constructed and arranged in accordance with the invention can be selectively multiplied to enable the base to accommodate and operate multiple containers of pills of the same or different substances.

Various further changes and modifications to the embodiments herein chosen for purposes of illustration will readily occur to those skilled in the art. To the extent that such modifications and variations do not depart from the spirit of the invention, they are intended to be included within the scope thereof.

The invention claimed is:

1. A prescription content provider, comprising:

a first processor; and a second processor coupled to a data store including an authorization code and pill-dispensing program instructions, the second processor programmed to receive an Internet code from the first processor of a programmable pill-dispensing apparatus, compare the Internet code to the authorization code, and automatically serve the pill-dispensing program instructions from the data store to the programmable pill-dispensing apparatus through the Internet upon the second processor matching the Internet code to the authorization code verifying the pill-dispensing program instructions to a prescription of pills to be dispensed by the programmable pill-dispensing apparatus, the pill-dispensing program instructions configured to program the programmable pill-dispensing apparatus to effectuate a dispensing of the pills by the programmable pill-dispensing apparatus, and wherein the programmable pill-dispensing apparatus includes a base and a container, the base configured to scan the Internet code of the container to connect to the second processor.

2. The prescription content provider according to claim 1, wherein the dispensing comprises a regimented dispensing.

3. The prescription content provider of claim 1, wherein the pill-dispensing program instructions are downloaded to a memory of the programmable pill-dispensing apparatus.

4. The prescription content provider of claim 3, wherein the memory of the programmable pill-dispensing apparatus includes a non-transitory computer readable storage medium.

5. The prescription content provider of claim 1, wherein the programmable pill-dispensing apparatus includes a measurement device operatively coupled to the first processor, the measurement device configured to take a reading of a presence or an extent of a presence of a condition of or a substance in a biological sample, and the first processor configured to receive the reading from the measurement device.

6. The prescription content provider of claim 5, wherein the measurement device is a glucose meter.

7. The prescription content provider of claim 5, wherein the measurement device is a sphygmomanometer.

8. The prescription content provider of claim 5, wherein the measurement device stores the reading.

9. The prescription content provider of claim 8, wherein the stored reading triggers an alert if the stored reading is above or below a programmed threshold.

10. The prescription content provider of claim 1, wherein the programmable pill-dispensing apparatus is portable.

11. A method, comprising the steps of:

providing a first processor coupled to a data store including an authorization code and pill-dispensing program instructions;

receiving, by the first processor, from a second processor of a programmable pill-dispensing apparatus through the Internet a code;

comparing, by the first processor, the code to the authorization code; and automatically serving, by the first processor, the pill-dispensing program instructions from the data store to the programmable pill-dispensing apparatus through the Internet upon the first processor matching the code to the authorization code verifying the pill-dispensing program instructions to a prescription of pills to be dispensed by the programmable pill-dispensing apparatus, the pill-dispensing program instructions downloaded to the programmable pill-dispensing apparatus to effectuate a dispensing of the pills by the programmable pill-dispensing apparatus, wherein the programmable pill-dispensing apparatus includes a base and a container, the base configured to scan the code of the container to connect to the first processor.

12. The method according to claim 11, wherein the dispensing comprises a regimented dispensing.

13. The method of claim 11 further comprising:

reading the code with an RFID reader, and wherein the code comprises digital data of an RFID tag carried by the programmable pill-dispensing apparatus.

14. The method of claim 13, wherein the step of reading the code further comprises the RFID reader issuing an electromagnetic interrogation pulse to the RFID tag and the RFID tag transmitting the digital data to the RFID reader in response.

15. The method of claim 11, wherein the pill-dispensing program instructions are downloaded and installed onboard the programmable pill-dispensing apparatus.

* * * * *